United States Patent
Appel et al.

Patent Number: 6,159,640
Date of Patent: Dec. 12, 2000

[54] ELECTROLYTE SYSTEM FOR LITHIUM BATTERIES AND USE OF SAID SYSTEM, AND METHOD FOR INCREASING THE SAFETY OF LITHIUM BATTERIES

[75] Inventors: Wolfgang Appel; Sergej Pasenok, both of Kelkheim, Germany

[73] Assignee: Hoechst Research & Technology GmbH & Co. KG, Frankfurt am Main, Germany

[21] Appl. No.: 09/096,552

[22] Filed: Jun. 12, 1998

[30] Foreign Application Priority Data

Jun. 13, 1997 [DE] Germany .............. 197 24 709

[51] Int. Cl.⁷ ................................ H01M 6/16
[52] U.S. Cl. .................. 429/324; 429/199
[58] Field of Search .......... 429/324, 327–330, 429/199, 306, 307, 334, 339, 231.95; 252/62.2

[56] References Cited

U.S. PATENT DOCUMENTS

| | | | |
|---|---|---|---|
| 5,385,794 | 1/1995 | Yokoyama et al. ........ | 429/334 |
| 5,866,711 | 7/1997 | Hung et al. ............ | 560/167 |

FOREIGN PATENT DOCUMENTS

| | | |
|---|---|---|
| 0575591 | 12/1993 | European Pat. Off. . |
| 0599534 | 6/1994 | European Pat. Off. . |
| 6-20719 | 1/1994 | Japan . |
| 7-249432 | 9/1995 | Japan . |

*Primary Examiner*—Maria Nuzzolillo
*Assistant Examiner*—Susy Tsang
*Attorney, Agent, or Firm*—Frommer Lawrence & Haug

[57] ABSTRACT

Electrolyte systems for lithium batteries of increased safety comprise at least one lithium-containing conducting salt and at least one electrolyte fluid and, according to the invention, are defined by at least one partially fluorinated carbamate of general formula (I)

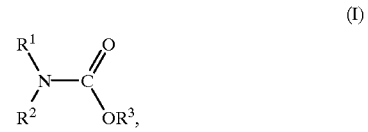

where $R^1$ and $R^2$ independently of one another or identical or different, linear $C_1$–$C_6$-alkyl, branched $C_3$–$C_6$-alkyl, $C_3$–$C_7$-cycloalkyl or $R^1$ and $R^2$ directly or via one or more additional nitrogen and/or oxygen atoms are linked to form a ring having from 3 to 7 ring members, and the additional nitrogen atoms present in the ring being substituted with $C_1$–$C_3$-alkyl and the ring carbon atoms optionally carrying $C_1$–$C_3$-alkyl, with the option of one or more hydrogen atoms in the radicals $R^1$ and $R^2$ being replaced by fluorine atoms, $R^3$ is a partially fluorinated or perfluorinated straight-chain alkyl group having from 1 to 6 carbon atoms, is a partially fluorinated or perfluorinated branched alkyl group having from 3 to 6 carbon atoms or a partially fluorinated cycloalkyl group having from 3 to 7 carbon atoms, which optionally be monosubstituted or polysubstituted with $C_1$–$C_6$-alkyl.

15 Claims, No Drawings

ELECTROLYTE SYSTEM FOR LITHIUM BATTERIES AND USE OF SAID SYSTEM, AND METHOD FOR INCREASING THE SAFETY OF LITHIUM BATTERIES

RELATED APPLICATIONS

This application claims priority under 35 U.S.C. §119 to German application 19 724 709.1, filed Jun. 13, 1997.

BACKGROUND OF THE INVENTION

1. Field of the Invention

The invention relates to electrolyte systems for lithium batteries of increased safety, which comprise at least one lithium-containing conducting salt and at least one electrolyte fluid, to the use thereof, and to a method for enhancing the safety of lithium batteries.

2. Background of the Invention

Portable, sophisticated electronic equipment such as mobile phones, laptop computers, camcorders, etc., are enjoying a market which is growing extremely rapidly. An adequate electrical supply of this equipment requires low-weight, high-capacity and high-quality power sources. The upshot of environmental and economic considerations is that quite predominant use is made of secondary, rechargeable batteries. Essentially, three systems are competing here with one another: nickel-cadmium, nickel-metal hydride and lithium-ion batteries. Another interesting field for this battery system could be the use in electrically driven vehicles.

SUMMARY OF THE INVENTION

Because of its excellent performance characteristics, the lithium battery has already captured a large share of the market, even though, in current technology, it was introduced into the market as late as 1994. Despite this triumphant progress of the secondary lithium battery the fact should not be overlooked that in terms of safety aspects it does present some problems.

The rechargeable lithium batteries usually comprise a compound of lithium oxide and a metal oxide as the cathode (for example $Li_xMnO_2$ or $Li_xCoO_2$) and lithium metal as the anode, the lithium preferentially being used as an intercalation compound with graphite or with carbon fibers or graphite fibers. An overview of the use of such batteries is given by K. Brandt (Solid state ionics 69 (1994), 173–183, Elsevier Science B.V.).

The electrolyte fluids used to achieve high conductivities in the prior art preferentially are solvent mixtures of at least two or alternatively more components. The mixture must comprise at least one strongly polar component which, owing to its polarity, has a stronger dissociative effect on salts, ethylene carbonate or propylene carbonate generally being employed as polar components of this type. These highly polar solvents are relatively viscous and usually have relatively high melting points, e.g. 35° C. for ethylene carbonate. To ensure adequate conductivity even at lower operating temperatures, one or more low-viscosity components are generally additionally admixed as "thinners". Examples of typical thinners are 1,2-dimethoxyethane, dimethyl carbonate or diethyl carbonate. Usually, the thinners are admixed in a proportion of 40–60% of the total volume. A grave drawback of these thinner components resides in their high volatility and the low flash points: 1,2-dimethoxyethane: b.p. 85° C., flash point –6° C. and explosion limit between 1.6 and 10.4 vol %; dimethyl carbonate: b.p. 90° C., flash point 18° C. At present, no equivalent substitutes exist for these "thinners"

Given that the electrochemical use of electrolyte solutions always results in warming, and that this applies to a far greater extent in the event of faults (short-circuiting, overcharging, etc.), this means—particularly if the cell should burst and solvent should escape—the risk of ignition and corresponding serious consequences. With the systems currently used, this is avoided, in principle, by elaborate electronic control systems. Nevertheless, some accidents due to fires in the course of fabrication and use of rechargeable lithium batteries are known to have happened. This would constitute a far greater potential hazard in the case of electric vehicles. These require considerably larger quantities of electrolyte fluid per energy storage system, and the electronic management of numerous interconnected cells is far more difficult and involves correspondingly higher risks.

To increase safety, cathode and anode compartments can be separated by a microporous separator membrane having the characteristic that, as a certain limit temperature is exceeded, fusion of the pores causes the current flow to be interrupted. Suitable membranes of this type are found, for example, in the ®CELGARD line from Hoechst Celanese Corporation.

Another option to increase the safety of lithium batteries is to make use of overpressure safety devices responding to the liberation of gas in the event of overcharging, and also, as already mentioned, by means of monitoring and control electronics.

Also recommended are flame-retardent phosphorous- and halogen-containing additives, although these often have an adverse effect on the performance characteristics of the batteries.

All these measures, however, are unable to preclude that, in the event of malfunctions, the highly volatile and highly flammable "thinner" will ultimately still ignite, resulting, after rupture of the cell, in a fire that will be virtually uncontrollable with standard extinguishing agents. Burning lithium will react very violently not only with water, but also with carbon dioxide.

Regarding the specific state of the art, reference is made to the publications

JP-A-7-249432=D1,

EP-A-0 631339=D2,

EP-A-0 599534=D3,

EP-A-0 575591=D4,

U.S. Pat. No. 5,169,736=D5,

B. Scrosati, Ed., 2nd International Symposium on Polymer Electrolytes, Elsevier, London and New York (1990)=D6, U.S. Pat. No. 5,393,621=D7 and

JP-A-06020719=D8.

D1 and D2, for example, propose highly fluorinated ethers as electrolyte solvents or as additives to other electrolytes. These are generally highly stable, both thermally and chemically, and have high flash points. However, on the one hand, they have far too low a dissolving power for the required lithium electrolyte salts to be used on their own, and on the other hand are not sufficiently miscible with the customary battery solvents.

Partially fluorinated carbonates have likewise been described as electrolytes having elevated flash points (D3). The problems in this case, however, are that those compounds which appear suitable owing to their low viscosity have an only moderately elevated flash point (37° C.) and the electrical conductivities are distinctly below the prior art (assumption: measurements were carried out at room temperature, no temperature specified).

Carbamates have likewise been described as thinners for anhydrous electrolytes (D4). While their boiling points are higher than those of currently used thinners, their flash points are hardly any better.

Disclosed by D8, as electrolytes for secondary lithium batteries, are ester compounds of formula $R^1COOR^2$, where at least one of the radicals $R^1$ and $R^2$ is fluorine-substituted. The preferred compound is methyl trifluoroacetate. However, this compound has a boiling point of only 43° C. and a flash point of −7° C., which constitutes a high safety risk in the event of damage.

According to the prior art, reduced flammability of the electrolyte solution is achieved, in particular, by an increase in the viscosity of the electrolyte solution by means of binders or fillers or via the use of polymer electrolytes which are virtually solid at room temperature.

D5, for example, describes organic or inorganic thickeners (poly(ethylene oxide), $SiO_2$, $Al_2O_3$ and others), to consolidate liquid electrolyte solutions.

Polymer electrolytes based on macromolecules having numerous polar groups, such as poly(ethylene oxides), as disclosed, for example, by D6, are likewise far less flammable, owing to their low volatility.

D7 describes polymer electrolytes whose polar macromolecules are formed by polymerization of organophosphorous compounds, which are distinguished by particularly low flammability.

What all these gel-like to solid electrolytes have in common is that, owing to their high viscosity, the mobility of the ions of the salts dissolved therein is far less than in liquid electrolyte solutions, so that, particularly at relatively low temperatures, the requisite conductivities are no longer achieved, at least for most technical applications. This is why, for example, alkali metal batteries comprising polymer electrolytes are continuing to fail, in spite of very intensive research spanning decades, to achieve economic significance.

In view of the prior art as stated and discussed herein it is therefore an object of the invention to provide novel electrolyte solvents which are chemically and physically stable, are sufficiently miscible with other suitable solvents, adequately dissolve lithium conducting salts and have a distinctly higher flash point, but nevertheless exhibit viscosity and conductivity behavior that makes them suitable for practical use even at low temperatures.

These objects as well as others not specified in detail are achieved by an electrolyte system of the type mentioned at the outset, which comprises at least one lithium-containing conducting salt and at least one electrolyte fluid, comprising as effect content of at least one electrolyte fluid, comprising an effective content of at least one partially fluorinated carbamate of general formula (I), herein defined below. Advantageous modifications of the novel electrolyte system are protected in the dependent product claims. Regarding the method for increasing the safety of lithium batteries, the subject matter of the claim specifies a solution of the problem on which the invention is based.

As a result of the electrolyte system for lithium batteries having an effective content of at least one partially fluorinated carbamate of general formula (I)

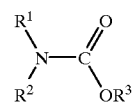

where
- $R^1$ and $R^2$ independently of one another are identical or different, linear $C_1$–$C_6$-alkyl, branched $C_3$–$C_6$-alkyl, $C_3$–$C_7$-cycloalkyl or
- $R^1$ and $R^2$ directly or via one or more additional nitrogen and/or oxygen atoms are linked to form a ring having from 3 to 7 ring members, and the additional nitrogen atoms present in the ring being saturated with $C_1$–$C_3$-alkyl and the ring carbon atoms possibly likewise carrying $C_1$–$C_3$-alkyl, with the possibility of one or more hydrogen atoms in the radicals $R^1$ and $R^2$ being replaced by fluorine atoms,
- $R^3$ is a partially fluorinated or perfluorinated straight-chain alkyl group having from 1 to 6 carbon atoms, is a partially fluorinated or perfluorinated branched alkyl group having from 3 to 6 carbon atoms or a partially fluorinated cycloalkyl group having from 3 to 7 carbon atoms, which may or may not be monosubstituted or polysubstituted with $C_1$–$C_6$-alkyl, and it becomes possible, in a particularly advantageous and not readily foreseeable manner, to provide an electrolyte which is superior or at least equivalent to the known electrolyte systems for lithium batteries with respect to the customary requirement spectrum and at the same time provides for increased safety compared with the previously known systems.

In particular it was found, surprisingly, that electrolyte systems for lithium batteries comprising an addition of partially fluorinated carbamate of general Formula I show very good to excellent compliance with the following requirements:

1. High thermal stability;
2. High flash point;
3. Low vapor pressure;
4. High boiling point;
5. Low viscosity;
6. Good miscibility with solvents customary in batteries, especially with ethylene carbonate, propylene carbonate or α, ω dialkyl glycol ethers;
7. Good dissolving power for lithium conducting salts, for example $LiClO_4$;
8. Good dissolving power for fluorine-containing lithium conducting salts, for example $LiPF_6$, $LiN(SO_2CF_3)_2$ or $LiC(SO_2CF_3)_3$;
9. Good electrical conductivity of their solutions of electrolyte salts over a wide temperature range;
10. High stability with respect to metallic lithium;
11. High decomposition voltage;
12. Good dissolving power for carbon dioxide: $CO_2$ accelerates the build-up of protective films on lithium and $LiC_n$ anodes;
13. Good dissolving power for $SO_2$: this improves the conductivity over the entire temperature range and the build-up of protective films on the electrodes;
14. Unusual tolerance to initial moisture content. Thus, even with water contents of the electrolyte up to 10,000 ppm, good electrode protective films still built up, and stable electrolyte systems were obtained.

DETAILED DESCRIPTION OF THE INVENTION

The designation "linear $C_1$–$C_6$-alkyl" or "straight-chain alkyl group having from 1 to 6 carbon atoms" comprises the radicals methyl, ethyl, n-propyl, n-butyl and n-hexyl;

The designation "branched $C_3$–$C_6$-alkyl" or "branched alkyl group having from 1 to 6 carbon atoms" comprises the radicals isopropyl, isobutyl (2-methylpropyl), sec-butyl (1-methylpropyl), t-butyl (1,1-dimethylethyl), 1-methylbutyl, 2-methylbutyl, isopentyl (3-methylbutyl), 1,2-dimethylpropyl, t-pentyl (1,1-dimethylpropyl), 2,2-dimethylpropyl, 3,3-dimethylpropyl, 1-ethylpropyl, 2-ethylpropyl, and the branched hexyls, in particular inter alia 1-methylpentyl, 2-methylpentyl, 3-methylpentyl, 4-methylpentyl, 1,1-dimethylbutyl, 2,2-dimethylbutyl, 3,3-dimethylbutyl, 1,2-dimethylbutyl, 1,3-dimethylbutyl, 2,3-dimethylbutyl, 1-ethylbutyl, 2-ethylbutyl, 3-ethylbutyl, 1,1,2-trimethylpropyl, 1,2,2-trimethylpropyl, 1-methyl-1-ethylpropyl, 1-ethyl-2-methylpropyl;

The designation "$C_3$–$C_7$-cycloalkyl" comprises cyclopropyl, cyclobutyl, cyclopentyl, cyclohexyl, cycloheptyl;

"$C_1$–$C_6$-alkyl", without the specification linear or branched, as a matter of principle comprises both linear and branched radicals, preferentially the linear radical;

"Radicals $R^1$ and $R^2$ linked directly to form a ring having from 3 to 7 ring members" especially mean aziridinyl, azetidinyl, pyrrolidinyl, piperidinyl, azepanyl;

"Radicals $R^1$ and $R^2$ linked, via one or more additional nitrogen and/or oxygen atoms to form a ring having from 3 to 7 ring members" mean, for example, oxaziridinyl, diaziridinyl, 1,3-oxazetidinyl, 1,3-diazetidinyl, oxazolidinyl, diazolidinyl, morpholinyl (tetrahydro-1,4-oxazinyl), tetrahydro-1,4-diazinyl.

Partially fluorinated compounds or radicals within the scope of the invention mean compounds or radicals in which at least one, but not all, of the carbon-bound hydrogen atoms of the compound in question or the radical in question is replaced by fluorine.

Perfluorinated compounds or radicals, within the scope of the invention, are compounds or radicals in which all carbon-bound hydrogen atoms of the compound or the radical have been substituted by fluorine.

The novel electrolyte systems for lithium batteries of increased safety, which comprise at least one lithium-containing conducting salt and at least one electrolyte fluid, comprise "an effective content" of one or more compounds of the general Formula I. Within the scope of the invention, this is understood to be such an amount of partially fluorinated or perfluorinated carbamate of Formula I as to be sufficient to fabricate a useable and functional secondary lithium battery.

In principle, the invention relates to compounds which are distinguished in that a trialkylated carbamate is present, in which especially the radical located on the oxygen comprises one or more fluorine atoms.

Of particular interest among the compounds of the general Formula I are inter alia those compounds in which, in Formula I, $R^1$ and $R^2$ represent linear $C_1$–$C_4$-alkyl, branched $C_3$–$C_4$-alkyl, cyclopropyl, cyclobutyl, where one or more hydrogen atoms may be substituted by fluorine atoms.

Where the radicals $R^1$ and $R^2$ are linked together to form a ring, this ring contains at least one nitrogen atom and is fully saturated, $R^1$, $R^2$ therefore being linked via methylene groups —$(CH_2)_n$— to form a ring, n being an integer between 2 and 5. At the same time, $C_1$–$C_3$-alkyl substituents may be present on the ring, the ring may contain oxygen or $C_1$–$C_3$-alkyl-substituted nitrogen atoms, as for example in —$(CH_2)_m$—O—$(CH_2)_p$— or in —$(CH_2)_m$—N(alkyl)—$(CH_2)_p$— where m,p=1, 2 or 3. In addition, one or more hydrogen atoms may be replaced by fluorine.

Particularly expedient electrolyte systems result if the system comprises compounds of Formula 1, in which the radicals $R^1$ and $R^2$ are linked directly or via an additional nitrogen or oxygen atom to form a ring having 5 or 6 ring members.

An electrolyte system with excellent performance characteristics also results if one or more of compounds I are present, in which $R^3$ is a partially fluorinated or perfluorinated straight-chain alkyl group having from 1 to 4 carbon atoms or a partially fluorinated or perfluorinated branched alkyl group having 3 or 4 carbon atoms.

In another advantageous embodiment an electrolyte system is defined by the presence therein of compounds of Formula I, in which the radical $R^3$ has the composition $C_nH_{2n+1-m}F_m$, where n=1 to 6 and m=1 to 13.

The inventive solution of the safety problem of secondary lithium batteries is achieved by the use of compounds of Formula I as an essential component of the electrolyte system, one of the aspects being utilized being their comparatively favorable viscosity.

The substances of general formula I can be used as thinners for low-flammability high-viscosity components, for example ethylene carbonate and propylene carbonate. Thus it is possible to prepare aprotic electrolyte systems which are virtually non-flammable.

In a particular embodiment of the invention, the content of carbamates of formula (I) is from 5 to 100, preferably from 20 to 70, vol %, based on the total volume of the electrolyte system. This means that it is possible for carbamates of formula (I) to be the sole solvent and thinner of a secondary lithium battery.

The compounds according to formula I in the pure form, however, can serve not only, on their own, as safety electrolyte fluids for nonaqueous battery systems, they can also be used in conjunction with known electrolyte fluids such as carbonates, esters, lactones, nitriles and the like, as electrolyte fluid systems or electrolyte fluid combinations or, for the purpose of an additional increase in the conductivity over the entire temperature range and yet a further improvement of the protective-film formation at the electrodes, comprise certain additives (for example certain gases).

If the proportion of the carbamates of formula I to be used according to the invention in the electrolyte system of a secondary lithium battery is below 5 vol %, the hereinabove mentioned advantages 1 to 14 do not manifest themselves as markedly. Customarily the content is from 5 to 70 vol %, preferably from 20 to 50 vol %, based on the total volume of the electrolyte system.

Given the above explanations, very expedient modifications of the electrolyte systems according to the invention also result if, in addition to the content of at least one carbamate of general formula (I), an additional content of ethylene carbonate and/or propylene carbonate is present. In that case, preferably, no further component in addition to the conducting salt is present in the electrolyte system.

The partially fluorinated or perfluorinated carbamates according to formula I also improve the dissolving power for nonpolar or low-polarity gases, in particular $CO_2$, $N_2$, $N_2O$, $SF_6$, $SO_2FCl$ or $SO_2F_2$. These gases may advantageously be used as a protective gas in lithium batteries, since they have a positive effect on the reactions proceeding at the interface electrode/electrolyte [compare J. O. Besenhard et. al., J. Power Sources, 44 (1993), 413].

Of particular interest are electrolyte systems according to the invention for secondary lithium batteries in which $SO_2$ or $CO_2$ are used as a protective gas, and such systems, respectively, which are saturated with $SO_2$ or $CO_2$. This promotes a decidedly advantageous formation of protective films at the electrodes.

Particularly expedient systems also result if they comprise the components conducting salt, partially fluorinated or perfluorinated carbamate of general formula I, ethylene carbonate and/or propylene carbonate and $SO_2$ or $CO_2$.

The compounds of formula I in some cases are commercially available, can in some instances be synthesized in accordance with methods known from the literature or sometimes also be prepared in accordance with modified methods from the literature and are thus available. As part of the invention, a route to specific compounds of formula I is also specified.

Carbamates can generally be prepared in a two-stage synthesis, one way being the initial reaction of an alcohol with phosgene to give the corresponding chloroformate, which then, in a second step, reacts with a primary or secondary amine to form the carbamate (Method A).

Equally possible is the inverse procedure, in which the carbamoyl chloride is initially formed from phosgene and the amine and then, in the next stage, reacts with the alcohol to give the end product (Method B).

A particular variant of the preparation relates to carbamates perfluorinated in the alcohol moiety. To this end, the carbamoyl chloride synthesized in accordance with Method B is reacted, in the presence of cesium chloride, with the corresponding perfluoroalkanoyl fluoride, e.g. trifluoroacetyl fluoride, in an inert solvent.

Table 1 summarizes a few examples of preparation methods and physical characteristics of carbamates.

The invention also relates to secondary lithium batteries of increased safety, which are defined by comprising an electrolyte system according to the invention.

It is also known that reactive impurities (for example water) even in very low concentrations have drastic adverse effects on the functioning of the lithium batteries. In practice, the sum of such impurities should not exceed 50 ppm if possible. A major advantage of the compounds defined by formula I is that their boiling points are usually so high that complete removal of water and other reactive impurities by distillation is readily achievable.

The invention also provides a method for increasing the safety of a secondary lithium battery, the method being distinguished in that the electrolyte used is an electrolyte system according to the invention.

Finally, the invention also relates to the use of compounds of general formula (I) in safety electrolyte systems for lithium batteries.

EXAMPLES

The following examples illustrate the subject matter of the invention.

To prepare the electrolyte, the solvent components used are first prepared as follows:

Ethylene carbonate (>99%, from Merck) is distilled in an oil pump vacuum (boiling point 85 to 95° C.) and dehydrated for 3 days at 150° C. on an activated molecular sieve (from Roth, pore size 4 angstrom) and stored at 60° C. under a dried argon atmosphere (argon, 99.996%, from AGA, was first, to remove traces of oxygen, passed at 150° C. over copper(l)oxide [from BASF] which had been reduced with argon W5 [mixture of 95% argon and 5% hydrogen, industrial grade, from AGA] then dried over activated molecular sieve).

Propylene carbonate (purum, from Aldrich) is distilled in an oil pump vacuum over a 1.5 m metallized packed column (boiling point 64 to 66° C.) and stored over activated molecular sieve under a dried argon atmosphere to room temperature. After purification and drying, the residual water content of the solvents is determined according to the Karl Fischer method (for example with the automatic titration apparatus Mitsubishi CA 05). The water content should be below 10 ppm.

The fluorinated solvent component is dried for a few days over activated molecular sieve under a dried argon atmosphere at room temperature.

The preparation of the electrolyte solutions is effected via the so-called Schlenk technique in a dried argon stream, removing any moisture clinging to the glassware employed with a protective gas connection, before it is used, in a nonluminous bunsen burner flame, repeatedly alternating between argon purging and oil pump vacuum suction.

Example 1

Preparation of a Safety Battery Electrolyte Based on 2,2,2-trifluoroethyl N,N-dimethylcarbamate 28.7 g of lithium bis(trifluoromethanesulfon)imide (0.01 mol)("imide") are introduced into 70 ml of 2,2,2-trifluoroethyl N,N-dimethylcarbamate and, after a clear solution is obtained, made up to 100 ml by addition of the same solvent. The conductivity of the electrolyte thus prepared was measured from −60 to +60° C. For results see Table 2.

Example 2

Preparation of a Safety Battery Electrolyte Based on 2,2,2-trifluoroethyl N,N-dimethylcarbamatelpropylene carbonate (1:1)

In a 1:1 (v/v) mixture of 2,2,2-trifluoroethyl N,N-dimethylcarbamate and propylene carbonate (PC), 28.7 g of imide (0.1 mol) were dissolved, the solution then being made up to 100 ml by addition of the same mixture. The conductivity of this electrolyte was measured from −60 to +60° C. The results can be seen in Table 2.

Example 3

Preparation of a Safety Battery Electrolyte Based on 2,2,2-trifluoroethyl N,N-dimethylcarbamate with Lithium Hexafluorophosphate The preparation of the electrolyte was carried out as in Example 1, except that the electrolyte salt used was $LiPF_6$. The conductivity of this electrolyte was determined from −60 to +60° C. The results are shown in Table 2.

Example 4

Preparation of a Safety Battery Electrolyte Based on 2,2,2-trifluoroethyl N,N-dimethylcarbamate/ propylene Carbonate with Lithium Hexafluorophosphate The preparation of the electrolyte was carried out as in Example 2, except that the electrolyte salt used was 0.1 mol

Example 5

Preparation of a Safety Battery Electrolyte Based on 2,2,2-trifluoroethyl N,N-dimethylcarbamate with the Addition of Sulfur Dioxide Gas and Lithium Bis(trifluoromethanesulfon)imide 28.7 g (0.1 mol) of the imide were dissolved in 80 ml of the carbamate saturated with $SO_2$ gas, this then being made up to 100 ml with further $SO_2$-saturated carbamate. The conductivity of the electrolyte thus obtained was determined from −60 to +60° C. The results can be seen in Table 2.

Example 6

Preparation of a Safety Battery Electrolyte Based on 2,2,2-trifluoroethyl N,N-dimethylcarbamate/ ethylene Carbonate and Lithium Hexafluorophosphate The preparation was carried out as in Example 4, except that ethylene carbonate was used instead of PC. The conductivity of the electrolyte mixture thus obtained was studied from −60 to +60° C. The results can be seen in Table 2.

TABLE 2

| | Conductivity [mS/cm] | | | |
|---|---|---|---|---|
| Example No. | −10 [° C.] | 0 [° C.] | 25 [° C.] | 40 [° C.] |
| 1 | 1.2 | 1.8 | 2.9 | 3.6 |
| 2 | 1.9 | 2.7 | 5.1 | 7.1 |
| 3 | 1.2 | 1.7 | 2.8 | 3.5 |
| 4 | 2.0 | 2.8 | 5.6 | 8.0 |
| 5 | 2.3 | 2.8 | 4.1 | 4.7 |
| 6 | — | 3.1 | 6.7 | 9.4 |

Further advantages and embodiments of the invention can be deduced from the following claims.

TABLE 1

| Compound | Method | Boiling point ° C. | Flash point ° C. | Miscibility[1] (1:1) PC | Miscibility[1] (1:1) EC | Stability with respect to lithium[2] 20° C. | Stability with respect to lithium[2] 80° C. | Viscosity[3] mm²/s (20° C.) |
|---|---|---|---|---|---|---|---|---|
| 2,2,2-trifluoroethyl N,N-dimethylcarbamate | B | 138 | 85 | + | + | + | + | 1.0 |
| 2,2,2-trifluoroethyl N,N-diethylcarbamate | A, B | 140 | 76 | + | + | + | + | 1.4 |
| 2,2,2-trifluoroethyl N-piperidinecarbamate | B | 181 | 107 | + | + | + | + | 2.3 |
| 2,2,2-trifluoroethyl N-morpholinecarbamate | B | 220 | >110 | + | + | + | + | 6.8 |

[1]Miscibility at room temperature with propylene carbonate (PC) and ethylene carbonate (EC), respectively;
[2]Metallic lithium remains bright, no reaction takes place; (20° C.: 72h, 80° C.: 8h)
[3]Automatic capillary viscometer, AVS 310, from Schott Gerate.

We claim:

1. An electrolyte system for lithium batteries of increased safety and comprising at least one lithium-containing conducting salt and at least one electrolyte fluid, comprising at least one partially fluorinated carbamate of the formula (I)

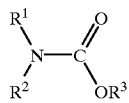

where
$R^1$ and $R^2$ independently of one another are identical or different, linear $C_1$–$C_6$ alkyl, branched $C_3$–$C_6$-alkyl, or $C_3$–$C_7$-cycloalkyl, wherein one or more of the hydrogen atoms in said alkyl or cycloalkyl groups are optionally replaced by fluorine atoms;
or
$R^1$ and $R^2$ are linked directly to form an optionally substituted $C_3$–$C_7$ membered ring wherein the optional substituents are $C_1$–$C_3$-alkyl group and one or more hydrogen atoms in said ring or said $C_1$–$C_3$-alkyl group are optionally replaced by fluorine atoms, and wherein one or more of the ring members are replaced by a nitrogen or oxygen atom where the nitrogen atom is optionally substituted by a $C_1$–$C_3$-alkyl group, in which the hydrogen atoms, in turn, are optionally replaced by fluorine atoms;
$R^3$ is a partially fluorinated or perfluorinated straight-chain alkyl group having from 1 to 6 carbon atoms, is a partially fluorinated or perfluorinated branched alkyl group having from 3 to 6 carbon atoms or a partially fluorinated cycloalkyl group having from 3 to 7 carbon atoms, is optionally monosubstituted or polysubstituted with $C_1$–$C_6$-alkyl.

2. An electrolyte system as claimed in claim 1, wherein $R^1$ and $R^2$ are independently a linear $C_1$–$C_4$ alkyl group, a branched $C_3$–$C_4$ alkyl group, a cyclopropyl group or a cyclobutyl group and wherein, optionally, one or more of the hydrogen atoms in said groups are replaced by fluorine atoms.

3. An electrolyte system as claimed in claim 1, wherein $R^1$ and $R^2$ are linked directly to form a $C_5$–$C_6$ membered ring and one of the ring members is optionally replaced by a nitrogen or oxygen atom.

4. An electrolyte system as claimed in claim 1, wherein $R^3$ is a partially fluorinated or perfluorinated straight-chain alkyl group having from 1 to 4 carbon atoms or a partially fluorinated or perfluorinated branched alkyl group having 3 or 4 carbon atoms.

5. An electrolyte system as claimed in claim 1, wherein the radical $R^3$ has the composition $C_nH_{2n+1-m}F_m$, where n=1 to 6 and m=1 to 13.

6. An electrolyte system as claimed in claim 1, wherein the content of carbamates of formula (I) is from 5 to 100, vol % of the total electrolyte system.

7. An electrolyte system as claimed in claim 1, which comprises, in addition to the content of at least one carbamate of general formula (I), an additional content of carbonates, esters, lactones and/or nitriles.

8. An electrolyte system as claimed in claim 1, which is saturated with $SO_2$ or $CO_2$.

9. An electrolyte system as claimed in claim 1, wherein an initial water content of up to 10,000 ppm is tolerated.

10. An electrolyte system as claimed in claim 1, wherein $R^1$ and $R^2$ together form a $-(CH_2)_m-O-(CH_2)_p-$ or a $-(CH_2)_m-N(alkyl)-(CH_2)_p-$ group, wherein m and p are independently 1, 2 or 3 and wherein one or more hydrogen atoms are replaced by fluorine.

11. An electrolyte system as claimed in claim 6, wherein the content of carbamates of formula (I) is from 20 to 70% of the total electrolyte volume.

12. An electrolyte system as claimed in claim 7, wherein the additional carbonate is ethylene carbonate or propylene carbonate or a mixture thereof.

13. A secondary lithium battery having increased safety, the battery comprising an electrolyte system as claimed in claim 1.

14. A lithium battery which comprises the electrolyte system as claimed in claim 1.

15. A method for increasing the safety of a secondary lithium battery, wherein the electrolyte used is a system as claimed in claim 1.

* * * * *